United States Patent Office 3,030,391
Patented Apr. 17, 1962

3,030,391
12-ALKOXY-11-OXYGENATED PREGNANES
Patrick A. Diassi, Westfield, N.J., assignor to Olin Mathieson Chemical Corporation, New York, N.Y., a corporation of Virginia
No Drawing. Filed May 29, 1961, Ser. No. 113,080
15 Claims. (Cl. 260—397.45)

This invention relates to synthesis of steroids and more particularly to the prepartion of 12-alkoxypregnanes.

One object of this invention is the provision of advantageous processes for preparing steroids of the progesterone series containing a 12α-(lower alkoxy) group and either an 11β-hydroxy or 11-keto group. Another object of this invention is the provision of steroids of the progesterone series, having a 12α-(lower alkoxy) group and either an 11β-hydroxy or 11-keto group, which compounds are useful either for their own physiological action or as intermediates in the preparation of physiologically-active derivatives.

The preferred compounds of this invention are those which are comprehended by the general formula:

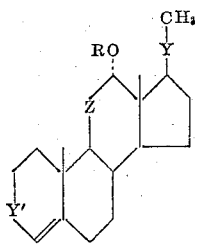

wherein Y and Y' are the same or different and represent either a =C=O or a

radical, wherein R' is hydrogen or the acyl radical of a hydrocarbon carboxylic acid of less than twelve carbon atoms; Z represents either a =C=O or a

radical; and R is lower alkyl (e.g., methyl, ethyl, propyl, isopropyl, n-butyl, n-pentyl, and n-hexyl).

Representative compounds of this invention include, inter alia, 12α-(lower alkoxy)-11β-hydroxyprogesterones, such as 12α-methoxy-11β-hydroxyprogesterone and 12α-ethoxy-11β-hydroxyprogesterone; 12α-(lower alkoxy)-11-ketoprogesterones, such as 12α-methoxy-11-ketoprogesterone and 12α-ethoxy-11-ketoprogesterone; 12α-(lower alkoxy)-Δ⁴-pregnene-3β,11β,20β-triols, such as 12α-methoxy-Δ⁴-pregnene-3β,11β,20β-triol and 12α-ethoxy-Δ⁴-pregnene-3β,11β,20β-triol; 3,20-diesters of 12α-(lower alkoxy)-Δ⁴-pregnene-3β,11β,20β-triols, such as the diesters with hydrocarbon carboxylic acids of less than twelve carbon atoms, as exemplified by the lower alkanoic acids (e.g., acetic, propionic and butyric acid), the lower alkenoic acids, the monocyclic aryl carboxylic acids (e.g., benzoic acid), the monocyclic ar(lower alkanoic) acids (e.g., phenacetic and β-phenylpropionic acid), the cycloalkanecarboxylic acids (e.g., cyclohexanecarboxylic acid), and the cycloalkenecarboxylic acids; 12α-(lower alkoxy)-Δ⁴-pregnene-11β,20β-diol-3-ones, such as 12α-methoxy-Δ⁴-pregnene-11β,20β-diol-3-one and 12α-ethoxy-Δ⁴-pregnene-11β,20β-diol-3-one; and 20-monoesters of 12α-(lower alkoxy)-Δ⁴-pregnene-11β,20β-diol-3-ones, such as the monoesters with the hydrocarbon carboxylic acids listed hereinbefore.

The steroids of this invention can be prepared by a number of different processes. According to one process, 9α-bromo-11-ketoprogesterone is treated with an alkali lower alkoxide in the lower alkanol (e.g., sodium methoxide in methanol) whereby the coresponding 12α-(lower alkoxy)-11-ketoprogesterone is obtained. Alternatively, 11β,12β-epoxyprogesterone can be treated with a lower alkanol in the presence of a strong acid, such as perchloric acid, to yield the corresponding 12α-(lower alkoxy)-11β-hydroxyprogesterone, which, if desired, can be oxidized by treatment with a hexavalent chromium compound, such as chromic anhydride, to yield the corresponding 12α-(lower alkoxy)-11-ketoprogesterone.

12α-(lower alkoxy)-11-ketoprogesterone can then be reduced, as by treatment with lithium aluminum hydride, to yield the corresponding 12α-(lower alkoxy)-Δ⁴-pregnene-3β,11β,20β-triol derivative, which, if desired, can be esterified to yield the 3,20-diester in the usual manner by treatment with an acyl chloride or acid anhydride in the presence of an organic base such as pyridine. The preferred esterifying agents are the acyl chlorides and acid anhydrides of hydrocarbon carboxylic acids of less than twelve carbon atoms, as exemplified by the hydrocarbon carboxylic acids listed hereinbefore.

The 12α-(lower alkoxy)-Δ⁴-pregnene-3β,11β,20β-triols can, if desired, be selectively oxidized by treatment with manganese dioxide to yield the corresponding 12α-(lower alkoxy)-Δ⁴-pregnene-11β,20β-diol-3-ones, which may then, if desired, be esterified by treatment with one of the acylating agents listed hereinbefore to yield the 20-monoester derivative.

The compounds of this invention are pharmacologically-active steroids, useful as progestational agents. Hence the new compounds of this invention can be used in lieu of known progestational steroids in the treatment of functional uterine bleeding, for example, with concentration and/or dosage based on the activity of the particular compound.

The following examples are illustrative of the invention (all temperatures being in centigrade):

EXAMPLE 1

*12α-Methoxy-11β-Hydroxyprogesterone*

To a suspension of 200 mg. of 11β,12β-oxidoprogesterone in 5 ml. of methanol, 0.1 ml. of 70% perchloric acid is added and the mixture stirred at room temperature for 5 hours during which time the steroid dissolves. After neutralization with 5% NaHCO₃ and slow addition of 5 ml. of water, crystals separate. These are filtered, washed with water and dried to give about 172 mg. of 12α-methoxy-11β-hydroxyprogesterone having M.P. about 164–165°; [α]$_D^{22}$+210° (chlf.);

$\lambda_{max.}^{alc.}$ 242 mμ (ε = 16,400); $\lambda_{max}^{Nujol}$ 2.74, 2.92, 5.88, 6.04, 6.20μ

*Analysis.*—Calcd. for C₂₂H₃₂O₄: C, 73.30; H, 8.95; OCH₃, 8.60. Found: C, 73.30; H, 8.88; OCH₃, 8.92.

EXAMPLE 2

*12α-Ethoxy-11β-Hydroxyprogesterone*

Following the procedure of Example 1 but substituting 5 ml. of ethanol for the methanol, 12α-ethoxy-11β-hydroxyprogesterone is obtained.

In a similar manner, propanol, isopropanol, n-butanol and n-pentanol yield 12α-propoxy-11β-hydroxyprogesterone, 12α-isopropoxy-11β-hydroxyprogesterone, 12α-n-butoxy-11β-hydroxyprogesterone and 12α-n-pentoxy-11β-hydroxyprogesterone, respectively.

EXAMPLE 3

*12α-Methoxy-11-Ketoprogesterone*

To a stirred suspension of 10 g. of 9α-bromo-11-ketoprogesterone in 300 ml. of methanol which has been flushed with nitrogen, 25 ml. of 2 N sodium methoxide in methanol are added and the mixture stirred under nitrogen at room temperature for 2½ hours during which time the steroid dissolves. The solution is then neutralized with 10% acetic acid, diluted with 500 ml. of water and extracted three times with 200 ml. portions of chloroform. The chloroform is washed with water and evaporated to dryness, in vacuo. The residue (9.4 g.) is dissolved in 60 ml. of benzene diluted with 120 ml. of hexane and adsorbed onto 200 g. of Woelm neutral alumina. Elution with benzene-hexane (3:1) or benzene gives a residue on evaporation of the solvent which on crystallization from acetone-hexane gives about 3.2 g. of 12α-methoxy-11-ketoprogesterone having M.P. about 121–122°; $[\alpha]_D^{23}+281°$ (chlf.);

$\lambda_{max.}^{alc.}$ 235 mμ (ε=19,200);

$\lambda_{max.}^{Nujol}$ 2.99, 5.82, 6.02, 6.18 and 6.26μ

*Analysis.*—Calcd. for $C_{22}H_{30}O_4$: C, 73.71; H, 8.44; $OCH_3$, 8.65. Found: C, 73.40; H, 8.30; $OCH_3$, 8.76.

12α-methoxy-11-ketoprogesterone can also be obtained from 12α-methoxy-11β-hydroxyprogesterone as illustrated by the following example:

EXAMPLE 4

To a solution of 100 mg. of 12α-methoxy-11β-hydroxyprogesterone in 4 ml. of acetone, 0.13 ml. of an aqueous solution containing 20.0 g. of chromic anhydride and 32.0 of sulfuric acid per 100 ml. is added dropwise. After stirring at room temperature for 15 minutes the excess chromic acid is decomposed by adding a few drops of methanol. The mixture is filtered and washed with acetone. The filtrate is then diluted with 10 ml. of water and extracted 3 x 5 ml. of chloroform. The chloroform is washed with water and evaporated to dryness, in vacuo. Crystallization from acetone-hexane gives about 70 mg. of 12α-methoxy-11-ketoprogesterone.

EXAMPLE 5

*12α-Ethoxy-11-Ketoprogesterone*

Following the procedure of Example 4 but substituting 100 mg. of 12α-ethoxy-11β-hydroxyprogesterone for the 12α-methoxy-11β-hydroxyprogesterone, 12α-ethoxy-11-ketoprogesterone is obtained.

Similarly, 12α-propoxy-11β-hydroxyprogesterone, 12α-isopropoxy-11β-hydroxyprogesterone, 12α-n-butoxy-11β-hydroxyprogesterone and 12α-n-pentoxy-11β-hydroxyprogesterone yield 12α-propoxy-11-ketoprogesterone, 12α-isopropoxy-11-ketoprogesterone, 12α-n-butoxy-11-ketoprogesterone and 12α-n-pentoxy-11-ketoprogesterone, respectively.

EXAMPLE 6

*12α-Methoxy-Δ4-Pregnene-3β,11β,20β-Triol*

To a solution of 200 mg. of 12α-methoxy-11-ketoprogesterone in 10 ml. of dry tetrahydrofuran 104 mg. of lithium aluminum hydride were added and the mixture stirred at room temperature for 3 hours. The excess lithium aluminum hydride was decomposed by adding a few drops of ethyl acetate the 20 ml. each of water and chloroform were added and the mixture acidified with dilute hydrochloric acid. The chloroform was separated, washed with water until neutral and evaporated to dryness, in vacuo, to yield a residue of 12α-methoxy-Δ4-pregnene-3β,11β,20β-triol.

Similarily, 12α-ethoxy-11-ketoprogesterone, 12α-propoxy-11-ketoprogesterone, 12α-isopropoxy-11-ketoprogesterone, 12α-n-butoxy-11-ketoprogesterone and 12α-n-pentoxy-11-ketoprogesterone yield, by the process of Example 6, 12α-ethoxy-Δ4-pregnene-3β,11β,20β-triol, 12α-propoxy-Δ4-pregnene-3β,11β,20β-triol, 12α-isopropoxy-Δ4-pregnene-3β,11β,20β-triol, 12α-n-butoxy-Δ4-pregnene-3β,11β,20β-triol, and 12α-n-pentoxy-Δ4-pregnene-3β,11β,20β-triol, respectively.

EXAMPLE 7

*12α-Methoxy-Δ4-Pregnene-3β,11β,20β-Triol 3,20-Diacetate*

150 mg. of 12α-methoxy-Δ4-pregnene-3β,11β,20β-triol is dissolved in 3 ml. of dry pyridine and 1 ml. of acetic anhydride is added. After 16 hours at room temperature ice water is added and the mixture is extracted with chloroform. The chloroform is washed successively with 2 N HCl, 5% $NaHCO_3$ and water and then evaporated to dryness, in vacuo. Crystallization of the residue from acetonehexane gives about 100 mg. of 12α-methoxy-Δ4-pregnene-3β,11β,20β-triol 3,20-diacetate having melting point about 200–202°;

$\lambda_{max.}^{Nujol}$ 2.83, 5.79, 5.86, 6.03μ

*Analysis.*—Calcd. for $C_{26}H_{40}O_6$ (448.58): C, 69.61; H, 8.99; $OCH_3$, 6.92. Found: C, 69.16; H, 8.70; $OCH_3$, 7.32.

Similarly, by substituting propionic anhydride and benzoyl chloride for the acetic anhydride in Example 7, the 3,20-dipropionate and 3,20-dibenzoate of 12α-methoxy-Δ4-pregnene-3β,11β,20β-triol are formed, respectively. Furthermore, if other 12α-(lower alkoxy)-Δ4-pregnene-3β,11β,20β-triols of this invention are substituted for the 12α-methoxy-Δ4-pregnene-3β,11β,20β-triol in Example 7, the corresponding 3,20-diacetates are obtained.

EXAMPLE 8

*12α-Methoxy-Δ4-Pregnene-11β,20β-Diol-3-One*

100 mg. of 12α-methoxy-Δ4-pregnene-3β,11β,20β-triol is treated with 1 g. of manganese dioxide and the mixture shaken at room temperature for 65 hours. The manganese dioxide is then filtered, washed well with chloroform and the combined filtrate and washings evaporated to dryness, in vacuo. The residue is chromatographed on alumina to give 12α-methoxy-Δ4-pregnene-11β,20β-diol-3-one.

Similarly, 12α-ethoxy-Δ4-pregnene-3β,11β,20β-triol, 12α-propoxy-Δ4-pregnene-3β,11β,20β-triol, 12α-isopropoxy-Δ4-pregnene-3β,11β,20β-triol, 12α-n-butoxy-Δ4-pregnene-3β,11β,20β-triol and 12α-n-pentoxy-Δ4-pregnene-3β,11β,20β-triol yield 12α-methoxy-Δ4-pregnene-11β,20β-diol-3-one, 12α-propoxy-Δ4-pregnene-11β,20β-diol-3-one, 12α-isopropoxy-Δ4-pregnene-11β,20β-diol-3-one, 12α-n-butoxy-Δ4-pregnene-11β,20β-diol-3-one and 12α-n-pentoxy-Δ4-pregnene-11β,20β-diol-3-one, respectively.

EXAMPLE 9

*12α-Methoxy-Δ4-Pregnene-11β,20β-Diol-3-One 20-Acetate*

150 mg. of 12α-methoxy-Δ4-pregnene-11β,20β-diol-3-one is dissolved in 3 ml. of dry pyridine and 1 ml. of acetic anhydride is added. After 16 hours at room temperature, ice water is added and the mixture is extracted with chloroform. The chloroform is washed successively with 2 N HCl, 5% $NaHCO_3$ and water and then evaporated to dryness, in vacuo. Crystallization of the residue from acetone-hexane gives about 100 mg. of 12α-methoxy-Δ4-pregnene-11β,20β-diol-3-one 20-acetate.

In a similar manner, the other 12α-(lower alkoxy)-Δ4-pregnene-11β,20β-diol-3-ones of this invention can be converted to their 20-acetate derivatives.

This invention may be variously otherwise embodied within the scope of the appended claims.

What is claimed is:
1. A compound selected from the group consisting of steroids of the general formulae

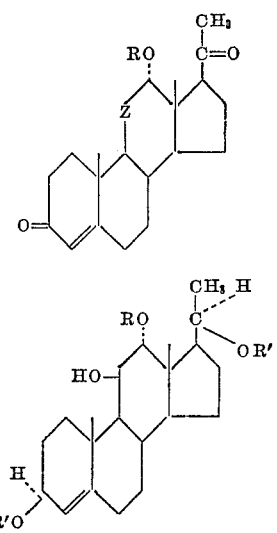

and

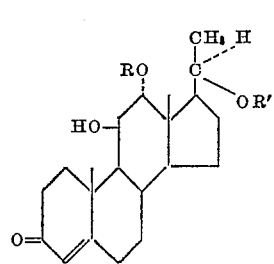

wherein R' is selected from the group consisting of hydrogen and the acyl radical of a hydrocarbon carboxylic acid of less than twelve carbon atoms; Z represents a radical selected from the group consisting of =C=O and

and R is lower alkyl.
2. 12α-(lower alkoxy)-11β-hydroxyprogesterone.
3. 12α-methoxy-11β-hydroxyprogesterone.
4. 12α-(lower alkoxy)-11-ketoprogesterone.
5. 12α-methoxy-11-ketoprogesterone.
6. 12α-(lower alkoxy)-Δ⁴-pregnene-3β,11β,20β-triol.
7. 12α-methoxy-Δ⁴-pregnene-3β,11β,20β-triol.
8. 12α-(lower alkoxy)-Δ⁴-pregnene - 3β,11β,20β - triol, 3,20-di(lower alkanoate).
9. 12α-methoxy-Δ⁴-pregnene-3β,11β,20β-triol, 3,20-diacetate.
10. 12α-(lower alkoxy)-Δ⁴-pregnene-11β,20β-diol-3-one.
11. 12α-methoxy-Δ⁴-pregnene-11β,20β-diol-3-one.
12. 12α-(lower alkoxy)-Δ⁴-pregnene-11β,20β-diol-3-one 20-(lower alkanoate).
13. 12α-methoxy - Δ⁴ - pregnene-11β,20β-diol-3-one 20-acetate.
14. A process for preparing a 12α-(lower alkoxy)-11β-hydroxyprogesterone which comprises interacting 11β,12β-epoxyprogesterone with a lower alkanol in the presence of a strong acid.
15. A process for preparing a 12α-(lower alkoxy)-11-ketoprogesterone which comprises interacting 9α-bromo-11-ketoprogesterone with a lower alkanol and an alkali lower alkoxide.

References Cited in the file of this patent
Sondheimer et al.: 75 J.A.C.S., 5930–32 (1953).